United States Patent [19]
Bell, Jr. et al.

[11] 3,854,026
[45] Dec. 10, 1974

[54] GATES TIMING SYSTEM FOR ELECTRICAL DISCHARGE MACHINING

[75] Inventors: Oliver A. Bell, Jr., Mooresville; Randall C. Gilleland, Statesville, both of N.C.

[73] Assignee: Colt Industries Operating Corp., New York, N.Y.

[22] Filed: Aug. 24, 1973

[21] Appl. No.: 391,504

Related U.S. Application Data

[63] Continuation-in-part of Ser. No. 373,377, June 25, 1973.

[52] U.S. Cl.......... 219/69 C, 219/69 P, 235/92 PB, 315/225, 331/144
[51] Int. Cl............................................. B23k 9/16
[58] Field of Search.............. 219/69 C, 69 M, 69 P; 331/144; 315/225; 235/92 TF, 92 SH, 92 PB

[56] References Cited
UNITED STATES PATENTS
3,769,483   10/1973   Bell et al..................... 219/69 C Primary Examiner—J. V. Truhe
Assistant Examiner—Hugh D. Jaeger
Attorney, Agent, or Firm—Hauke, Gifford, Patalidis & Dumont

[57] ABSTRACT

Electrical discharge machining is provided by generating a series of rectangular machining power pulses of a controllable on-off time duration. A circuit is included for specialized machining by providing spaced machining power pulse groups, and between each group there is included a single on-time pulse. A count down system is used to preset the number of pulses desired in each group, with the off-time between groups and single pulses being selectively adjustable in the circuit.

20 Claims, 3 Drawing Figures

3,854,026

GATES TIMING SYSTEM FOR ELECTRICAL DISCHARGE MACHINING

REFERENCE TO RELATED APPLICATION

The present application is a continuation-in-part of our application Ser. No. 373,377, filed June 25, 1973, for "Short Circuit Protection Circuit for Electrical Discharge Machining Apparatus."

BACKGROUND OF THE INVENTION

The field to which this invention relates is that field known as electrical discharge machining, hereinafter sometimes referred to as EDM, in which material is removed from an electrically conductive workpiece by the action of electrical gap discharges passing between a tool electrode and the workpiece. A dielectric liquid coolant is circulated and recirculated generally under pressure through the gap during machining operation. A servo feed system is normally used to provide for relative movement between the workpiece and electrode to maintain an optimum gap spacing as the workpiece material is progressively removed.

In order to provide electrical discharge machining with reliable and predictable results, an electrical discharge machining circuit of the independent pulse generator type is preferably used to provide machining power pulses of precisely controllable frequency and on-off time. In this particular type of EDM circuit, the pulse generator may be embodied as a multivibrator, oscillator, or the like. It will be understood that under adverse cutting conditions, such as when poor coolant flow condition is present or when the proper coolant flow pattern is particularly difficult to establish by reason of the specialized geometry of the electrode and the workpiece, it becomes difficult to maintain staple EDM cutting. More importantly, like problems are met with certain types of workpiece materials now being used for the production of dies, such as, for example, cast iron as it is now used in large sized stamping die production.

BRIEF STATEMENT OF THE INVENTION

It has been found advantageous when the above described conditions are encountered to provide a control for the pulse generator itself, such that the machining power pulses are periodically interrupted by extending the normal pulse off-time, preferably for a controllable time duration, in some cases equal to a multiple of the normal pulse off-time duration. It appears that it has become apparent that machining with the resultant spaced trains of power pulses has the effect of permitting gap recovery, avoiding DC arcing or gap short circuiting, and thus substantially contributing to and improving the stability of EDM cutting. Further, particularly with respect to cast iron cutting, this mode of cutting has the effect of eliminating any molten pool or spatter effects which have been known to occur on the workpiece surfaces. One circuit and system for providing this type of EDM machining is shown and described in U.S. application Ser. No. 228,661, filed on Feb. 23, 1972 on behalf of Dalton R. Verner for "Method and Apparatus for Electrical Discharge Machining Employing Periodic Extended Pulse Off Time," which application is of common ownership with the present application.

The present invention will be described with reference to an EDM power supply in which the pulse generator, drive stage and output switches are transistors, and in which the pulse generator is of the independent operating type as already generally described above. While transistors are employed as the electronic switching means in the preferred embodiment, the present invention is not limited to use in conjunction with such switching devices. By "electronic switch," we mean any electronic control device having a plurality of electrodes, comprising at least two principal or power conducting electrodes acting to control current flow in the power circuit, the conductivity of the power circuit being controlled by a control electrode within the switch, whereby the conductivity of the power circuit is regulated statically or electrically without the movement of any mechanical elements within the switch. Included in this definition, by way of illustration but not limitation, are vacuum tubes, transistors, semiconductor controlled rectifiers, and the like.

Our above mentioned application Ser. No. 373,377 relates to an EDM power supply with a novel and improved short circuit protection system. The present invention is adapted to operate independently of such system, or in conjunction with it, and for the convenience of description and in the interest of brevity the present invention is included in a like power supply circuit to the one shown and described in that application.

BRIEF DESCRIPTION OF THE DRAWINGS

Reference is made to the appended specification which explains the present invention and to the drawings in which like numerals and letters are used to refer to like elements which are shown throughout the several drawings, and wherein.

DETAILED DESCRIPTION OF THE PREFERRED EMBODIMENT

Figure 1:
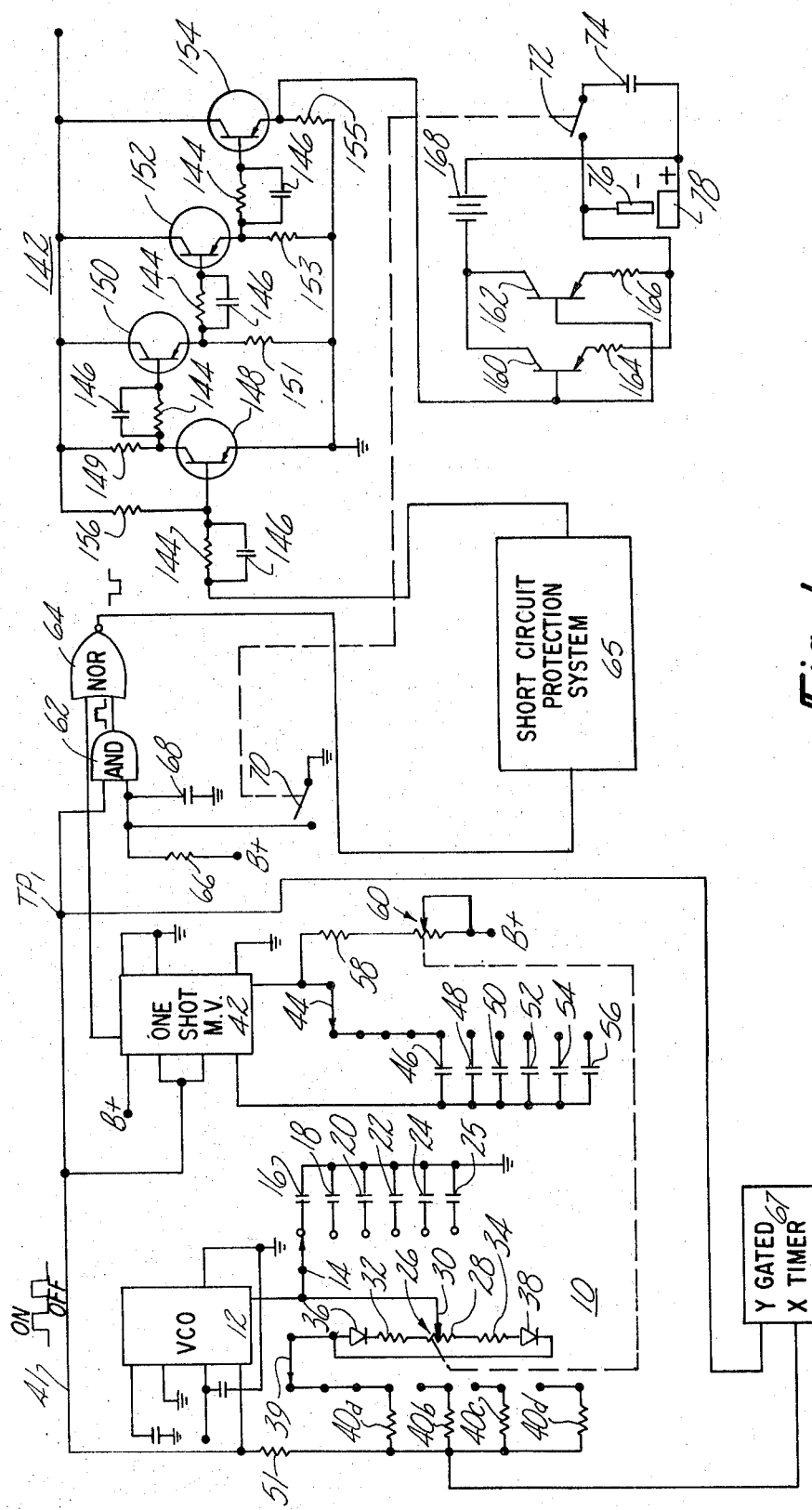
FIG. 1 is a combined block diagrammatic and schematic showing of the invention, setting forth the detail of the EDM pulse generator, the short circuit protection system, and the gated timer system involved.

The present invention will be explained with reference to FIG. 1 in relationship to an electrical discharge machining power supply that incorporates a pulse generator indicated generally by the numeral 10, and includes a voltage controlled oscillator 12 which provides at its output a saw-tooth voltage waveform. A capacitor tap switch 14 is included in the circuit to selectively connect one of a plurality of different value capacitors 16-25 in the circuit. The on-off time control portion of the pulse generator 10 includes a rheostat 26 having a variable resistor 28 and a movable contact slider 30. A pair of current limiting resistors 32, 34 are included in the circuit in series with the resistor 28 and a pair of diodes 36, 38, respectively. A further tap switch 39 is also included for adding into the circuit a selected one of a plurality of different magnitude resistors 40a–40d. A complete description of the oscillator 12 and its mode of operation is further given in our copending application Ser. No. 341,979, filed on Mar. 16, 1973, for "Pulse Generator for Electrical Discharge Machining Power Supply Circuit," which application is of common ownership herewith.

It will be understood that the first generator-multivibrator 10 just described is typically operable over a wide range of duty factor between one and ninety-nine percent. Also included in the circuit is a second pulse generator which comprises a retriggerable one-shot multivibrator 42 that is coupled to the output of the multivibrator 10. It will be understood that the oscillator 12 and the one-shot multivibrator 42 are preferably embodied as integrated circuits currently commercially available. An example of one voltage controlled oscillator suitable for use with the present invention is included in the tone frequency decoder Model SE/SN/567 currently commercially available from the Signetics Company of 811 East Argues Avenue, Sunnyvale, Calif. One type of a retriggerable monostable multivibrator, or one-shot, which is likewise available and suitable for use in connection with the present invention is Model N-74122 also available from the aforementioned Signetics Company.

In a like manner to the first multivibrator 10, the one-shot multivibrator 42 includes a selectively variable resistorcapacitor network which comprises a tap switch 44 and a plurality of different magnitude capacitors selectively switchable into the circuit to control pulse frequency of the output from the one-shot multivibrator 42. The associated capacitors are identified by the numbers 46, 48, 50, 52, 54 and 56. At the right side of the resistor-capacitor network, there is included a series resistor 58 and a rheostat 60 for presetting the on and off time operation of the one-shot multivibrator 42. As described in the aforementioned application Ser. No. 341,979, it will be understood that the duty factor of the one-shot multivibrator 42 is suitably limited to the value of the order of 30 percent of maximum on-time available. This is done to insure that during the gap capacitor mode of machining, which is explained in that application, there will be provided an adequate time for triggering of the output switches 160 and 162 and for charge and discharge of the gap capacitor 74 without resultant DC arcing or gap short circuiting.

The next following stages in the circuit are an AND gate 62 and a NOR gate 64. An external resistor-capacitor timing network is provided for the AND gate 62, which network includes a resistor 66 and a capacitor 68. The output waveform from the first multivibrator 10, with examplary on-off times indicated, is shown at the upper lead 41 in the drawing. This signal is provided as one input to the AND gate 62. The switch 70 is shown with its movable contact in an open position between the lower of the two inputs to the AND gate 62 and ground potential. A second switch 72 is shown connected intermediate the gap capacitor 74 and the gap. The capacitor 74 is switchable across the machining gap between the tool electrode 76 and workpiece 78 during the gap capacitor mode or finishing operation. A dash line is included in the drawing to indicate the ganged operation of the two switches 70 and 72. It will be understood that this conjoint operation between the two switches 70 and 72, which occurs during switching changeover as between regular and gap capacitor mode of operation, might as readily be achieved by including in the circuit a relay arrangement in which the actuation of one switch initiates the closure and operation of another circuit.

With respect to the NOR gate 64, it will be seen that it receives as its two signal inputs the output from the one-shot multivibrator 42 and the output from the AND gate 62. Connected between the output of the NOR gate 64 and the following drive stage 142 of the power supply circuit is a short circuit protection system shown in block diagram form and identified by the numeral 65. The circuit employed in the short circuit protection system 65 is described fully in the above mentioned application Ser. No. 373,377 and in the interest of brevity will not be repeated in the present application.

The present invention is indicated in block diagrammatic form as the gated timer system 67, which has its Y input terminal connected to PT1 point and its X output terminal connected to the lower end of a resistor 51 associated with the voltage controlled oscillator 12. The gated timer system 67 will be shown completely in the schematic of FIG. 2 hereinafter.

The remainder of the machining power supply circuit will now be described. The drive stage 42 has an input network including a base resistor 144 and a parallel capacitor 146. Four separate amplifier stages are included in the drive stage 142 with the first including a transistor 148 in a common emitter stage, the next three stages including transistors 150, 152 and 154, all being emitter follower stages. Parallel RC signal networks are also included in the input lead to each of the latter three stages which include a capacitor 146 and a resistor 144 in similar manner to the input network provided for the transistor 148. The three separate emitter resistors 151, 153 and 155 are included in circuit as shown in the drawing. In the first stage, including the transistor 148 and its collector-resistor 149, the transistor 148 is biased on by a resistor 156. The signal output from the final emitter follower stage, including the transistor 154, is used to control the operation of a pair of electronic output switches, namely transistors 160 and 162. The output switches 160 and 162 are parallel coupled and further connected in series between the main DC power source 168 and the machining gap which, as already indicated, includes the electrode 76 and the workpiece 78 with the minus-plus polarity as shown. It will be understood that while two output transistors are shown in the circuit, in accordance with the current requirement for the power supply a single transistor or a much greater number of transistors may be coupled to provide the necessary current magnitude. In the normal operation of EDM power supply in response to the turn-on and turn-off of the output transistor switches 160 and 162, a train of uniformly spaced machining power pulses will be provided to the gap.

Figure 2:
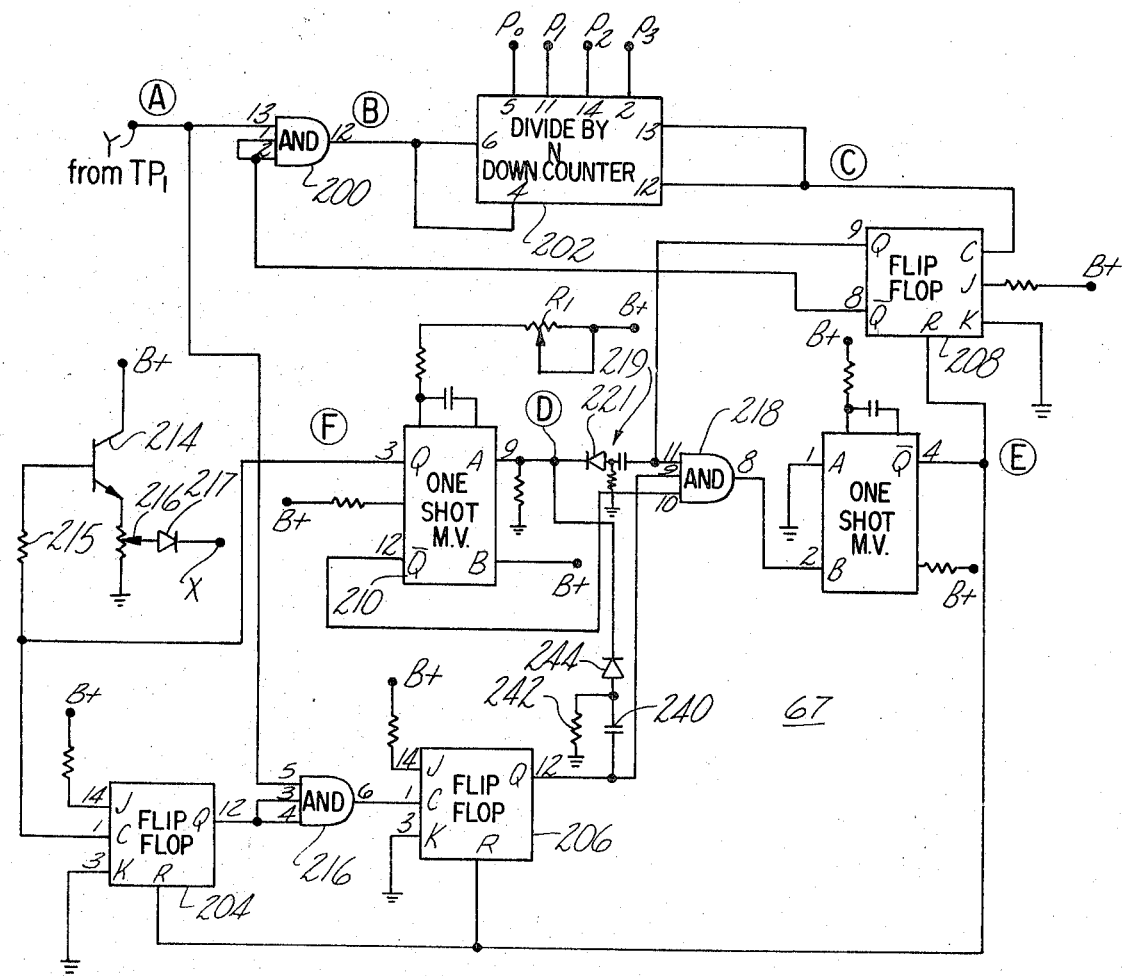
FIG. 2 is a detail schematic drawing showing the gated timer system employed in the power supply.

Reference is now made to FIG. 2 for the detail of the schematic of the gated timer 67 previously shown in block form in FIG. 1. It is the function of the gated timer circuit 67 to provide a selectively variable number of pulses with a selectively variable interval between groups of pulses, and further with a single pulse substantially equally spaced between the different pulse groups. As explained in the aforementioned Verner application Ser. No. 228,661, this leads to a greatly improved mode of operation, particularly with respect to machining cast iron which presents particularly difficult workpiece material for the EDM process.

Included in the gated timer circuit are its two input terminals Y which is with respect to FIG. 1 connnected to the PT1 point, and X which is connected to the terminal of the resistor 51 and the voltage controlled oscillator 12.

The basic building blocks used in the circuit are preferably of the integrated circuit type, using one of the standard logic systems such as, for example, TTL logic. It will be understood that the preferred embodiment is not limited to any particular type of integrated circuitry, such as TTL logic elements or DTL logic elements or others. The use of integrated circuits is desirable in the interest of reducing the complexity of circuitry, increasing its reliability and particularly in reducing the power requirements for the control system circuits. In the gated timer circuit 67, the several flip-flops used may be, for example, of the type SN7473 manufactured and sold by Signetics. The dual one-shot multivibrators as they are variously used may be, for example, of the type SN74123 also manufactured by Signetics. Several triple three input AND gates are further incorporated, likewise manufactured as Model SN7411 by the Signatics Corporation. A presettable module-N down counter is used which may be, for example, of the type NC4016 manufactured by Motorols Inc. of Phoenix, Ariz.

More particularly, the system will be seen to include the input terminal, a triple input AND gate 200, a down counter 202, then JH flip-flops 204, 206 and 208, and a pair of dual one-shot multivibrators 210 and 212. An NPN transistor 214 is connected to the input terminal X. An additional pair of triple input AND gates 216 and 218 are connected in the circuit a shown. In several cases there are external timing networks included which will be referred to as the operation of the circuit is described.

Figure 3:
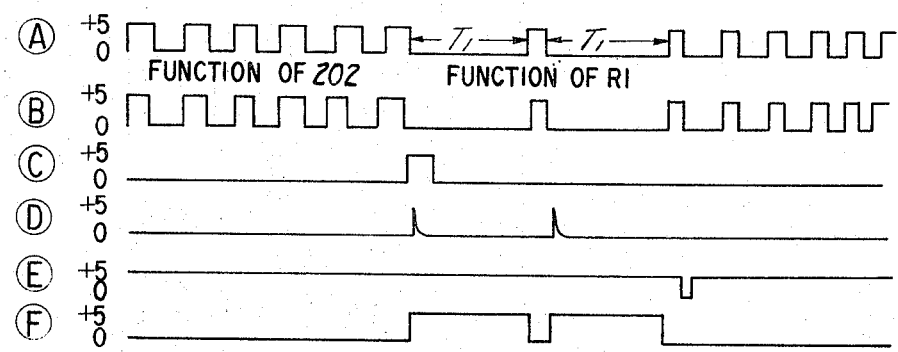
FIG. 3 is a voltage waveform diagram keyed to certain portions of the schematic of FIG. 2 to clarity the mode of operation of the circuit.

It will further be noted that the waveforms, as they are shown in FIG. 3, are designated by (A), (B), (C), (D), (E) and (F). The respective points at which these waveforms occur in the circuit of FIG. 2 are correspondingly lettered.

The description of the operation of the gated timer 67 will now be made with reference to FIG. 2. The two flip-flops 204 and 208 are in a reset position at the beginning of the operation. This applies a logical "one" to pins 1 and 2 of the AND gate 200. Pin 13 of the AND gate 200 receives a pulse train from TP1 through input terminal Y which represents the pulse output from the pulse generator 10 as shown in FIG. 1. The gate 200 is a triple three input positive AND gate. Since pins 1 and 2 represent a "one," the pulses on pin 13 are fed through to pin 12 of the gate 200. From pin 12, the pulses are delivered to pins 6 and 4 of the presettable down counter 202. The binary number applied to pins 5, 11, 14 and 2 of the counter 202 sets it to that number. At the start of count, the pins 12 and 13 are low, which represents a logical "zero." When the counter 202 reaches "zero," the output allows one of the incoming pulses out and resets the counter to the number that is on the preset inputs at points $P_0$-$P_3$. In the example used, the counter 202 is set for the number 6. In this case, on the trailing edge of the sixth pulse the output pins 12 and 13 deliver one pulse. This pulse will be of the width of the next on-time pulse seen by the counter 202. This causes the count from trailing edge to trailing edge to be 7 rather than 6. This condition is compensated for by wiring the switch to go from binary 3 to 12 instead of from 4 to 13. This pulse is then fed to the clock input of the JK flip-flop 208. ON the trailing edge of this pulse, the flip-flop 208 transfers the logical "one" on the J input to the Q output. This also causes the $\overline{Q}$ output of the flip-flop 208 to become a "zero." This "zero" is applied to the pins 1 and 2 of the AND gate 200, causing it not to pass any additional pulses. The "one" of the Q output of the flip-flop 208 on pin 9 is fed to the pin 11 of the AND gate 218 and also to an RC network 219. This represents a logical "one" or plus 5 volts which is fed into the RC network 219 where it becomes a very short duration pulse as illustrated by the waveform (D) in FIG. 3. The positive portion of the pulse is fed by a diode 221 into the pin 9 of the next following dual one-shot multivibrator stage 210. As the trailing edge of the pulse is felt on the pin 9, the one-shot multivibrator 210 fires, causing the Q output at pin 3 to become a logical "one." This pulse is fed to the base of the transistor 214 through a resistor 215 turning it on for the duration of the pulse. When the transistor 214 is conducting, a positive voltage is applied through a divider network including potentiometer 216 and a diode 217 to output terminal X to resistor 51 in FIG. 1. This stops the pulse generator 10 and the pulse output from transistors 160 and 162. The pulse at the same time is fed to the pin 10 of the AND gate 218. As the trailing edge of the pulse from the pin 5 of the one-shot 210 appears on the clock input of the flip-flop 204 at pin 1, the "one" on the J input pin 14 of the flip-flop 206 will appear on the Q output pin 12. This "one" is fed to the pins 3 and 4 of the AND gate 216. The pin 5 of the AND gate 216 receives the pulse train from TP1 in the circuit of FIG. 1. It will be understood that TP1 has been at a "zero" level during the pulse being fired from the one-shot multivibrator 210, but has now started to operate again. When the trailing edge of the first pulse is felt on the pin 6 of AND gate 216 and pin 1 of the flip-flop 206, the flip-flop 206 will clock the "one" on the J input, pin 14 to the Q output at pin 12. This causes two things to happen. First, the "one" is fed through an RC network including resistor 242 and capacitor 240 and through blocking diode 244 to the input of the one-shot multivibrator 210. This causes the one-shot multivibrator 210 to fire, once again stopping the multivibrator 10. Second, a pulse which is a logical "zero" is placed on the pin 10 of the AND gate 218. When the pulse ends, the $\overline{Q}$ output of the one-shot multivibrator 210 on pin 12, returns to a logical "one." This logical "one" on pin 10 with the two on the pins 9 and 11, causes the output at pin 8 to go high. The pin 8 is connected to the B input terminal of the other half of the one-shot multivibrator 212 at pin 2. When the input at pin 2 goes high, the one-shot multivibrator 212 fires, causing the $\overline{Q}$ output to go to "zero" level for a short time as shown by waveform (E) in FIG. 3. The $\overline{Q}$ output at pin 4 is connected to the clear inputs of the three other flip-flops, namely flip-flops 204, 206 and 208. As these clear inputs go to a "zero," these flip-flops are reset to their original states, that is, with their respective Q outputs being "zero" and their $\overline{Q}$ outputs being a "one." This restores all the gates to their original states and the counting process is then begun over again with repetition of the cycle as described above.

Now with reference to FIG. 3, it will be seen that the number of machining power pulses passed, as shown at (A), can be predetermined by the setting given to the divide by N counter 202. The times T1 which represent the periods between groups of pulses and before and after the intermediate single pulse can be reset as a function of the magnitude of the resistor R1 as shown in FIG. 2. This represents a substantial improvement with respect to the manner in which control pulse train cutting can be performed with EDM. The gated timer circuit in particular provides an advancement with respect to the ready adjustability and controllability of the pulse train cutting used in specialized machining.

It will be understood that in the manner described in the aforementioned application, the machining power supply operation may be interrupted during the occurrence of short circuit by the operation of the short circuit protection system 65. When changeover is made through the operation of switches 70, 72, a finishing operation with the gap capacitor 74 is initiated. Since the present invention is directed primarily toward gated timing for specialized cutting, such as of cast iron die workpieces, the detail of operation in the other two modes provided for is not repeated herein.

What is claimed is:

1. An apparatus for providing electrical discharge machining of a conductive workpiece by passing machining power pulses across a dielectric coolant filled gap, including a multivibrator having its output operatively connected to an electronic output switch for operating it with predetermined on-off time to provide machining power pulses across the gap, wherein the improvement comprises:
   a gated timer system operably connected to said multivibrator for providing machining by spaced groups of pulses, said groups having interposed therebetween single pulses, comprising:
   a counter operatively connected to the output of said multivibrator and presettable to pass a predetermined number of pulses;
   a first flip-flop stage operatively connected to the output of said counter for providing a signal responsive to the passage of the last of said predetermined number of pulses;
   turn-off means responsive to said signal for providing a turn-off pulse to said multivibrator for holding it off for a time period intermediate said group of pulses;
   a second flip-flop for allowing passage of a single next following pulse from said multivibrator and initiating a second like off time period of said multivibrator; and
   means operatively connected to said turn-off means for selectively adjusting the length of said time periods.

2. The combination as set forth in claim 1 wherein said multivibrator comprises a voltage controlled oscillator and a resistor-capacitor timing network operatively connected thereto for controlling the normal on-off time of said multivibrator.

3. The combination as set forth in claim 1 wherein said counter comprises a divide by N type down counter, said counter presettable in accordance with a binary number provided to its input terminals.

4. The combination as set forth in claim 3 wherein an electronic switch is operably connected between the output of said turn-off means and said voltage controlled oscillator for interrupting its operation in the off state for said time period.

5. The combination as set forth in claim 1 wherein said turn-off means comprises a one-shot multivibrator included in said system, said second flip-flop having its output operatively connected to said one-shot multivibrator for allowing passage of the single pulse intermediate the groups of pulses.

6. The combination as set forth in claim 5 wherein said time period is preset by a resistor-capacitor timing network, said network operatively associated with said one-shot multivibrator.

7. The combination as set forth in claim 2 wherein the input for said counter is derived from the output of said voltage controlled oscillator and the output of said gated timer system is connected to the resistor-capacitor timing network associated with said oscillator for holding it off for the predetermined period.

8. In an electric discharge machining apparatus having an electronic output switch operatively connected between a power source and the gap for providing machining power pulses thereto, a system for providing spaced groups of machining power pulses to said output switch, said groups further having interposed therebetween a single machining power pulse, said system including a gated timer circuit having its input coupled to the output from a free-running oscillator and its output operatively connected to and controlling the operation of the oscillator, wherein the improvement comprises:
   a down counter presettable to the number of pulses desired in each group;
   turn-off means operatively connected between the output of said counter and said oscillator for holding it off in its nonconductive state for a predetermined time period after the passage of the last pulse in each group; and
   means for allowing passage of a single pulse and then reenabling said turn-off means for a like time period.

9. The combination as set forth in claim 8 wherein an RC timing network is operably connected to said turn-off means for adjusting the duration of said time period.

10. The combination as set forth in claim 8 in which said turn-off means comprises a one-shot multivibrator stage having its output connected to said oscillator through an amplifier transistor stage.

11. The combination as set forth in claim 8 wherein said last mentioned means comprises a flip-flop operably connected between the output of said oscillator and said one-shot multivibrator stage.

12. The combination as set forth in claim 10 wherein an external RC timing network is coupled to said one-shot multivibrator stage for controlling its operation and hence the length of said time period.

13. In an electrical discharge machining apparatus having an electronic output switch operatively connected between a power source and the gap for providing machining power pulses thereto, a system for providing spaced groups of machining power pulses from said output switch, said groups further having interposed therebetween a single machining power pulse, said system including an oscillator, a gated timer circuit having its input coupled to the output from said oscillator and its output operatively connected to and controlling the operation of the oscillator, wherein the improvement comprises: a counter presettable to the number of pulses desired in each group of pulses; turn-off means operatively connected between the output of said counter and said oscillator for holding it off for a predetermined time period after the passage of the last pulse in each said group; and means for allowing passage of a single pulse and then re-enabling said turn-off means for a like time period.

14. The combination as set forth in claim 13 wherein an RC timing network is operatively connected to said turn-off means for adjusting the duration of said time period.

15. The combination as set forth in claim 13 wherein said turn-off means comprises a one-shot multivibrator stage having its output connected to said oscillator through an amplifier stage.

16. The combination as set forth in claim 13 wherein said last mentioned means comprises a flip-flop stage operatively connected between the output of said oscillator and said one-shot multivibrator stage.

17. In an electrical discharge machining apparatus having an electronic output switch operatively connected between a power source and the gap for providing machining power pulses thereto, a system for providing spaced groups of machining power pulses to said output switch, said system including a gated timer circuit having an input coupled to the output from a free running oscillator and its output operatively connected to and controlling the operation of said oscillator, wherein the improvement comprises: a counter presettable to the number of pulses desired in each group; a turn-off means operatively connected between the output of said counter and said oscillator for applying a turn-off pulse for holding it off for a predetermined time period after the passage of the last pulse in each group; and means for removing the turn off pulse from said oscillator and thus re-enabling its operation.

18. The combination as set forth in claim 17 wherein an RC timing network is operatively connected to said turn-off means for adjusting the duration of said time period.

19. The combination as set forth in claim 17 in which said turn-off means comprises a one-shot multivibrator stage having its output operably connected to said oscillator.

20. The combination as set forth in claim 17 wherein said last mentioned means comprises a flip-flop stage operatively connected between the output of said oscillator and said one-shot multivibrator stage.

* * * * *

UNITED STATES PATENT OFFICE
CERTIFICATE OF CORRECTION

Patent No. 3,854,026      Dated December 10, 1974

Inventor(s) Oliver A. Bell, Jr. and Randall C. Gilleland

It is certified that error appears in the above-identified patent and that said Letters Patent are hereby corrected as shown below:

In the Title: "GATES" should be --GATED-- .

Column 1, line 1, "GATES" should be --GATED-- .

Signed and sealed this 11th day of February 1975.

(SEAL)
Attest:

RUTH C. MASON
Attesting Officer

C. MARSHALL DANN
Commissioner of Patents
and Trademarks